(12) United States Patent
Pleva

(10) Patent No.: US 10,676,947 B2
(45) Date of Patent: Jun. 9, 2020

(54) MODULATING BUTTERFLY VALVE FOR CONTROLLING WATER LEVEL IN A SWIMMING POOL

(71) Applicant: Sentry Valve Company, Inc., Woodward, IA (US)

(72) Inventor: Mark G. Pleva, Woodward, IA (US)

(73) Assignee: Sentry Valve Company, Inc., Woodward, IA (US)

( * ) Notice: Subject to any disclaimer, the term of this patent is extended or adjusted under 35 U.S.C. 154(b) by 0 days.

(21) Appl. No.: 16/031,682

(22) Filed: Jul. 10, 2018

(65) Prior Publication Data
US 2020/0018084 A1    Jan. 16, 2020

(51) Int. Cl.
*E04H 4/12*   (2006.01)
*F16K 1/22*   (2006.01)
*F16K 31/24*  (2006.01)

(52) U.S. Cl.
CPC ........... *E04H 4/1245* (2013.01); *F16K 1/221* (2013.01); *F16K 31/24* (2013.01)

(58) Field of Classification Search
CPC .................................................... E04H 4/1245
USPC ................................................................ 4/508
See application file for complete search history.

(56) References Cited

U.S. PATENT DOCUMENTS 5,367,723 A * 11/1994 Pleva ..................... E04H 4/12
                                                                137/428

* cited by examiner

*Primary Examiner* — Lori L Baker
(74) *Attorney, Agent, or Firm* — McKee, Voorhees & Sease, PLC

(57) ABSTRACT

A valve assembly for regulating water level in a swimming pool includes a first butterfly valve in a pool drain line of the pool and a second butterfly valve in a fresh water line. The drain line and the fresh water line supply water to a pit remote from the pool. A return water line directs water from the pit to the pool. A float in the pit is operatively connected to both butterfly valves via first and second pivotal arms which are rotated by a sliding frame when the buoyant float rises and falls, so as to close and open the butterfly valves, and thereby maintain a desired water depth or level in the pit, and thereby a more consistent water level in the pool.

20 Claims, 21 Drawing Sheets

MODULATING BUTTERFLY VALVE FOR CONTROLLING WATER LEVEL IN A SWIMMING POOL

BACKGROUND OF THE INVENTION

Public swimming pools often utilize a surge pit and filter system for maintaining cleanliness of the pool water as well as controlling and maintaining proper water depth in the pool. A main drain line directs water from the pool to the surge pit. The gutter system of the pool also drains to the surge pit via a separate line. Ideally, for best performance, water level in the pool should skim continuously over the gutter edge for drainage to the surge pit. The main drain and gutter drain normally provide a mixed blend of water to the surge pit. A fresh water line from a municipal water source or well also may supply water to the surge pit.

The pool water level may change for various reasons, including normal entry and exit of people from the pool and splashing. Also, in outdoor pools, evaporation will lower the water level in the pool, while rain may increase the water level in the pool. Typically, when the pool water level drops, the surge pit water level drops, which may detrimentally affect the pool filtration system.

In the past, the water level in the pit was regulated or controlled by a manual valve, which inherently was a delayed reaction of changing water levels in the pool. Applicant's U.S. Pat. No. 5,367,723 addresses this delay issue and describes a regulating valve to automatically control the water level in the surge pit. This system utilized a float in the surge pit operatively connected to a gate valve on the main drain line and to the fresh water valve as the water level in the surge pit increases or decreases, the float will rise or fall, accordingly, and thereby close or open the gate valve and the fresh water valve, thereby maintaining a desired water depth in the surge pit. However, there are instances when a gate valve is not conducive or desirable on the main drain line of the swimming pool. Gate valves are often considered to be slow and more costly, for example as compared to a butterfly valve.

Accordingly, a primary objective of the present invention is the provision of a modulating butterfly valve on a swimming pool main drain line for controlling water level in the surge pit of the pool system.

Another objective of the present invention is the provision of a water valve assembly utilizing a float in the surge pit operatively connected to pivotal arms which control opening and closing of the butterfly valves in the main drain line and the fresh water line of a swimming pool.

A further objective of the present invention is the provision of a method of automatically regulating water level in a swimming pool.

Another objective of the present invention is the provision of a water valve assembly for regulating water level in a swimming pool.

Still another objective of the present invention is the provision of an improved butterfly valve assembly to maintain proper level in a swimming pool.

Yet another objective of the present invention is the provision of a swimming pool valve assembly or system which is economical to manufacture, and is effective, safe and durable in use.

These and other objectives will become apparent from the following description of the invention.

SUMMARY OF THE INVENTION

The water valve assembly of the present invention is designed for use in swimming pools, as well as other applications wherein water level control is needed. In a swimming pool application, a main drain line supplies water from the pool to a remote surge pit or tank. Also, water from the pool gutter system is delivered to the surge pit through a secondary line. A separate line also provides fresh water to the surge pit, when needed.

The valve system of the present invention includes a first butterfly valve in the main drain line and a second butterfly valve in the fresh water line. First and second arms are attached to the pivot axles of the first and second butterfly valves. A frame with a sliding member is mounted on the main drain pipe, with the first and second arms having free ends which slide through guides on the slide member as the slide member moves. The slide member is oriented vertically and is attached to a buoyant float. As the water level in the surge pit rises or falls, the float also rises or falls so as the raise and lower the slide member, which in turn, pivots the first and second arms through the guides, and thereby rotate the butterfly valves of the main drain line and the fresh water line between the closed and opened positions. The positions of the butterfly valves regulate the water level in the surge pit to maintain the desired water level in the pit.

In the method of the present invention, the buoyant float, which is operatively connected to the butterfly valves, floats on top of the water in the surge pit. When the water level in the pit drops, the float also drops and causes the butterfly valves to open so as to introduce more water into the pit from the main drain line and from the fresh water line and thereby raising the water level in the pit. As the water level in the pit rises, the float rises, thereby rotating the butterfly valves toward a closed position, thereby reducing flow of water from the main drain line and the fresh water line into the pit. Thus, the float and the interconnected valves automatically control or regulate the water level in the surge pit and thereby regulate the water level in the swimming pool.

BRIEF DESCRIPTION OF THE DRAWINGS

FIGS. 3-8 are various perspective views of the valve system with the butterfly valves in open positions and with the float removed for simplicity.

DETAILED DESCRIPTION OF THE PREFERRED EMBODIMENTS

Figure 1:
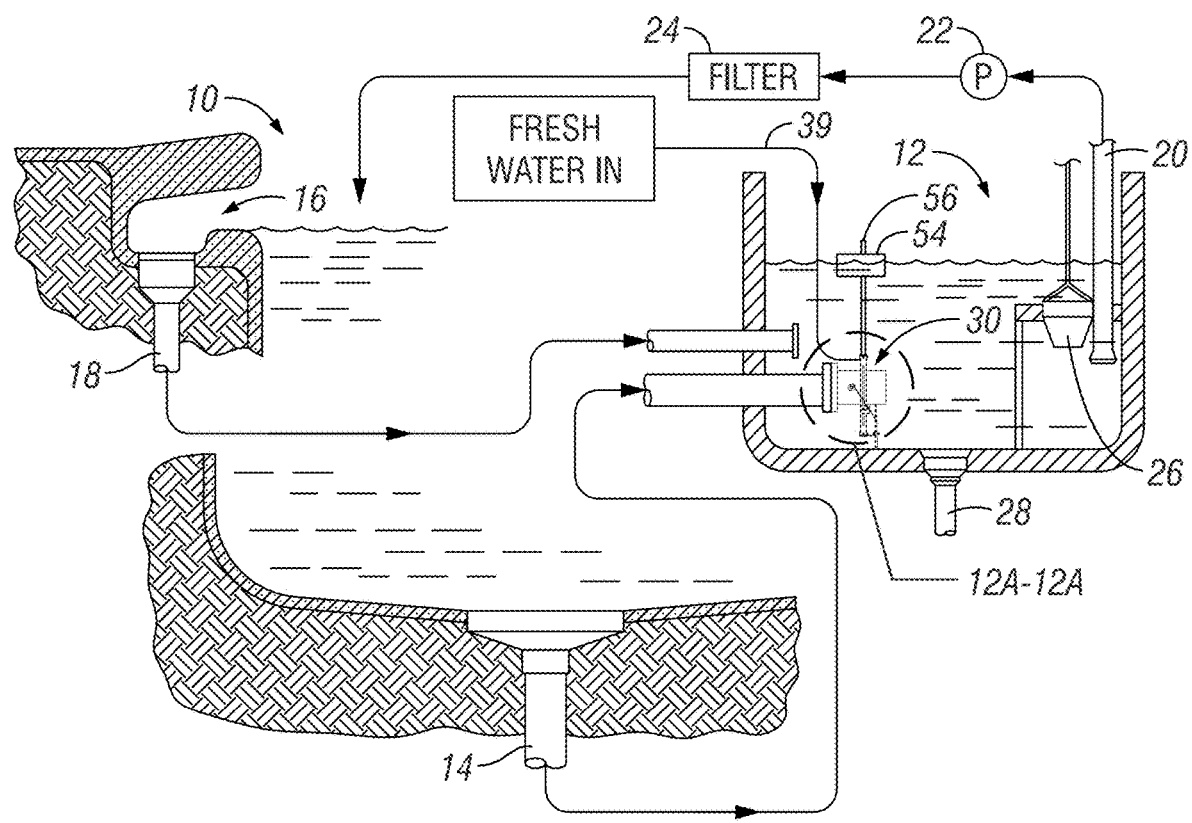
FIG. 1 is a schematic view showing a portion of a swimming pool with a gutter system and a surge pit, with the butterfly valve water level control system according to the present invention.
Figure 2A:
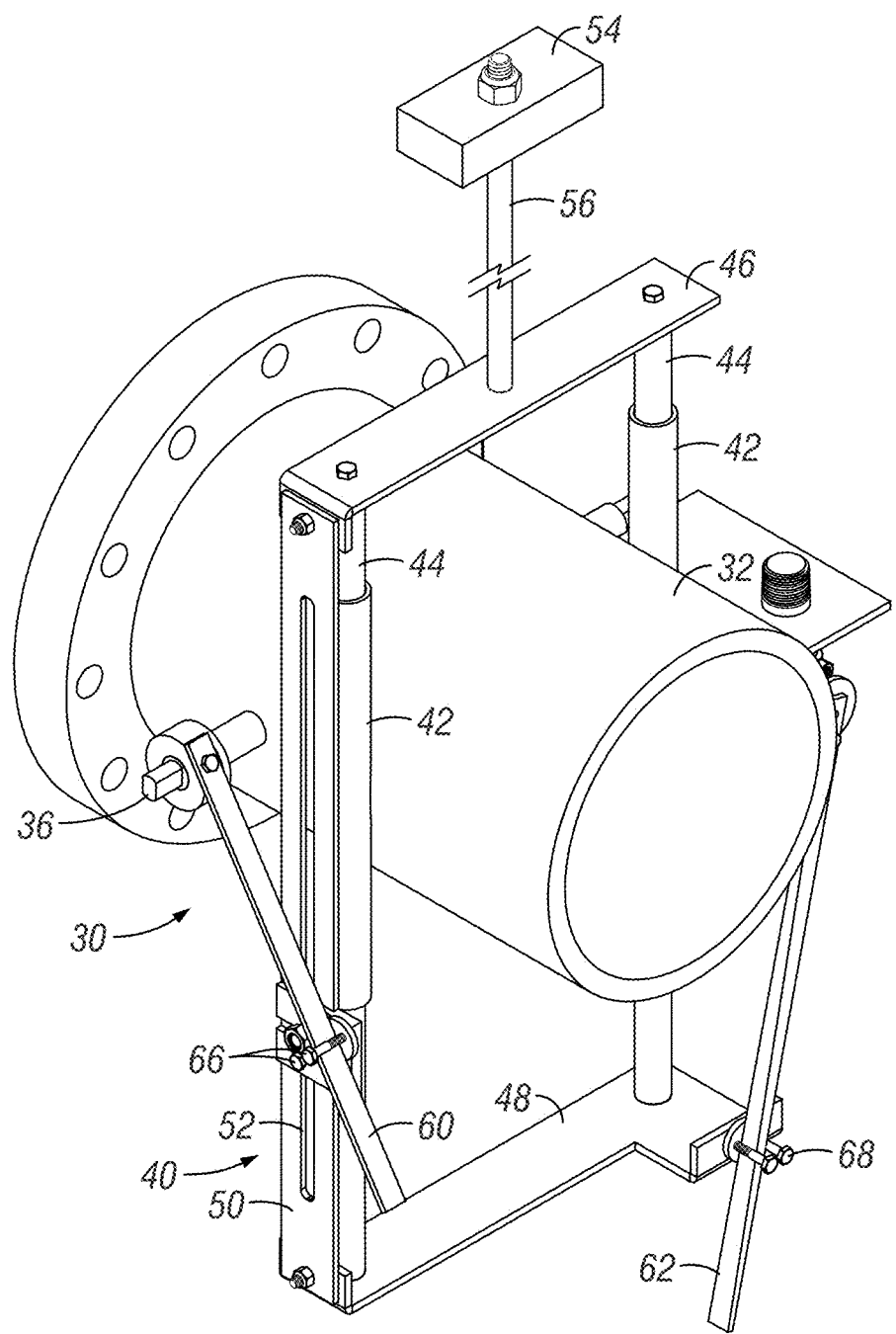
FIG. 2A is a perspective view of the valve system in an open position.
Figure 2B:
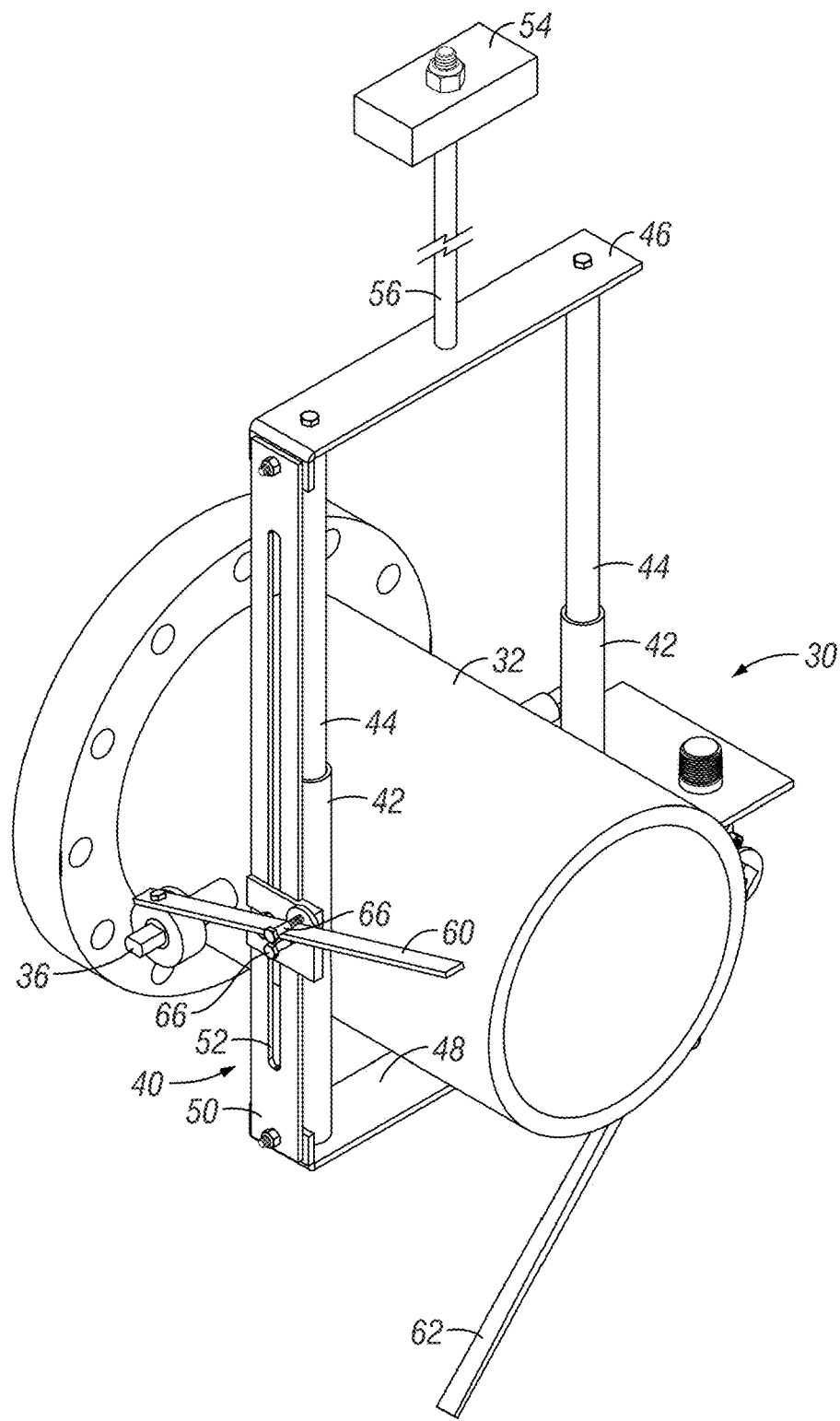
FIG. 2B is a perspective view of the valve system in a closed position.
Figure 3:
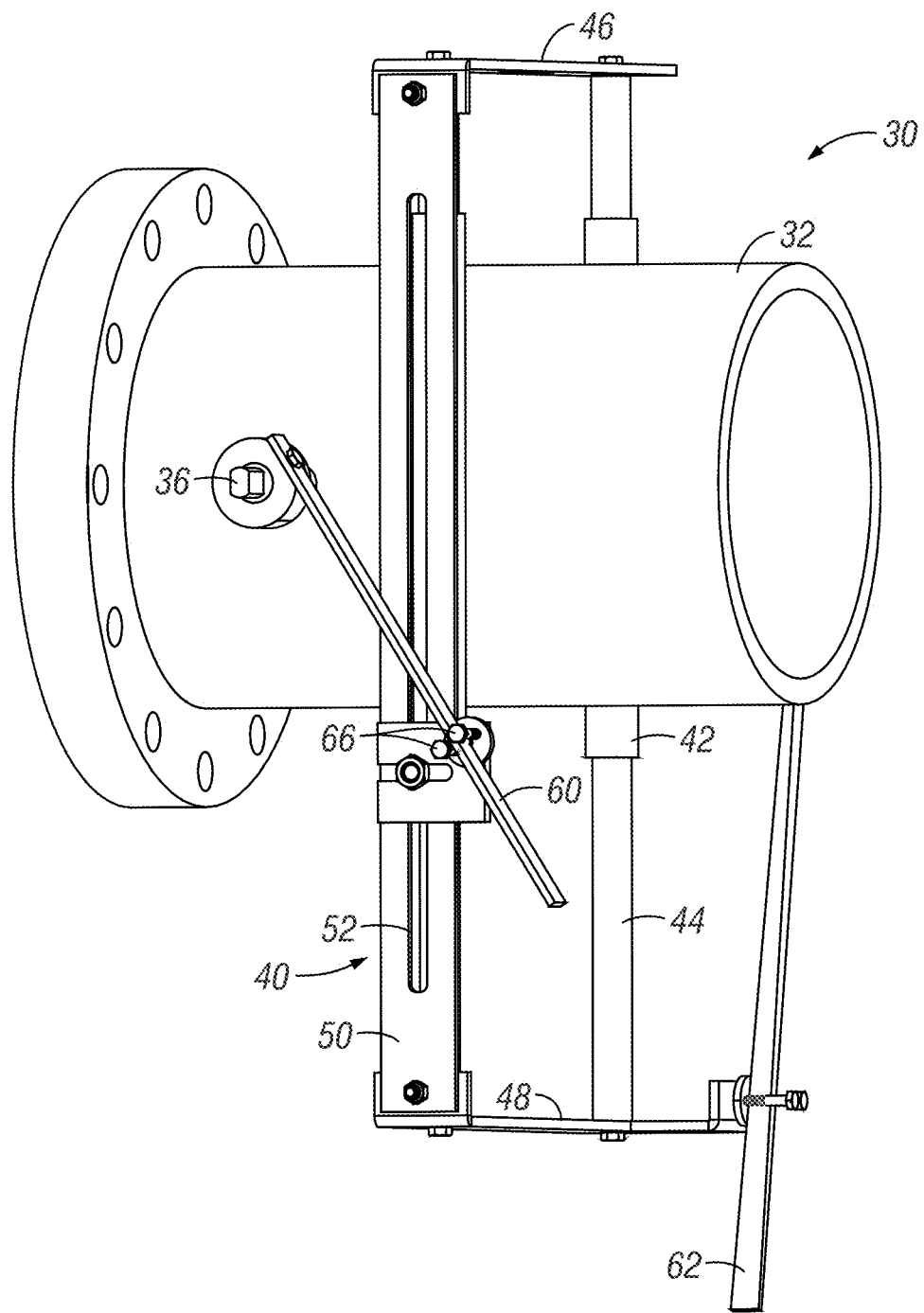
FIG. 3 is another perspective view of the system with the butterfly valves in a open positions.
Figure 4:
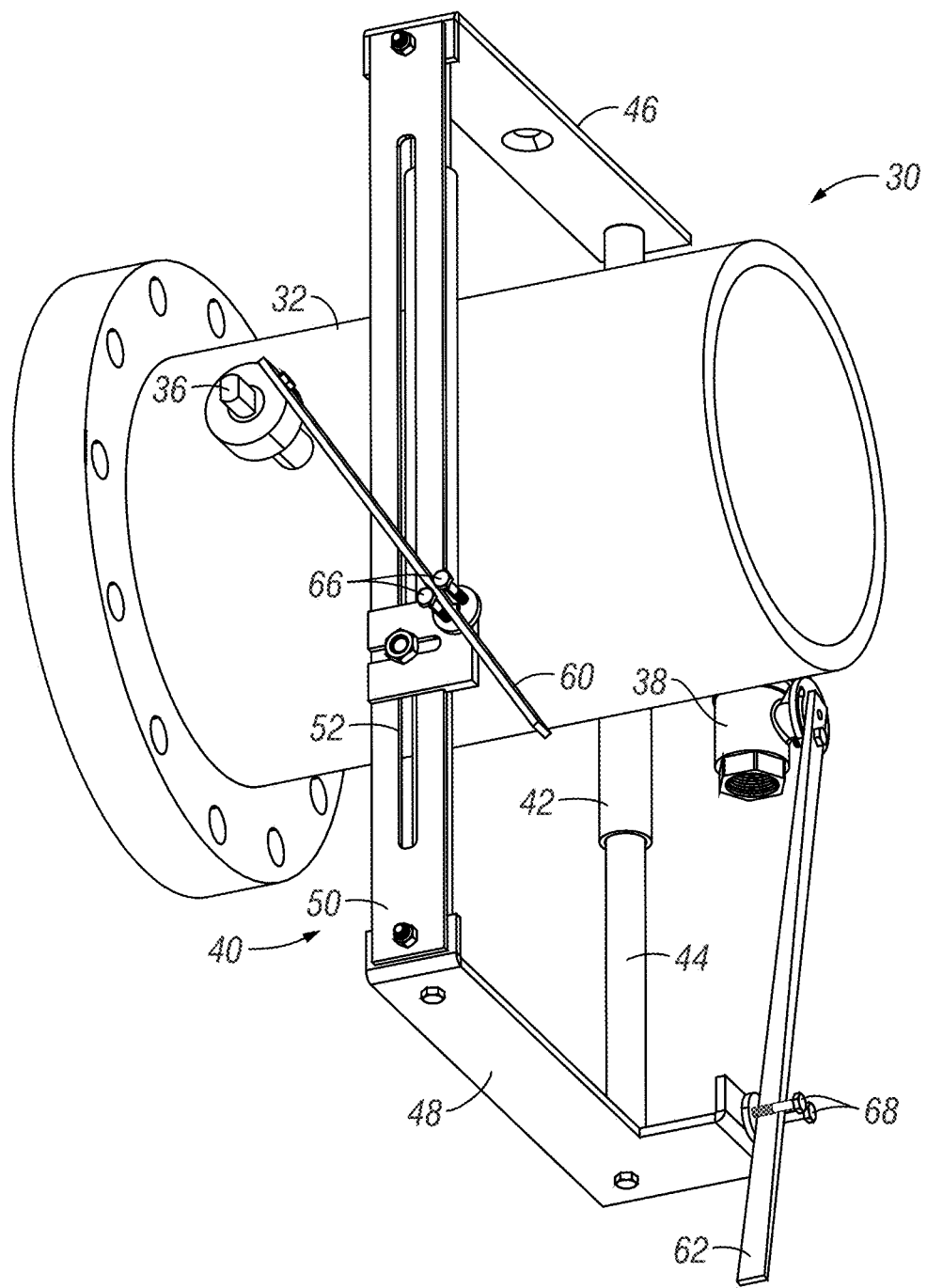
Figure 5:
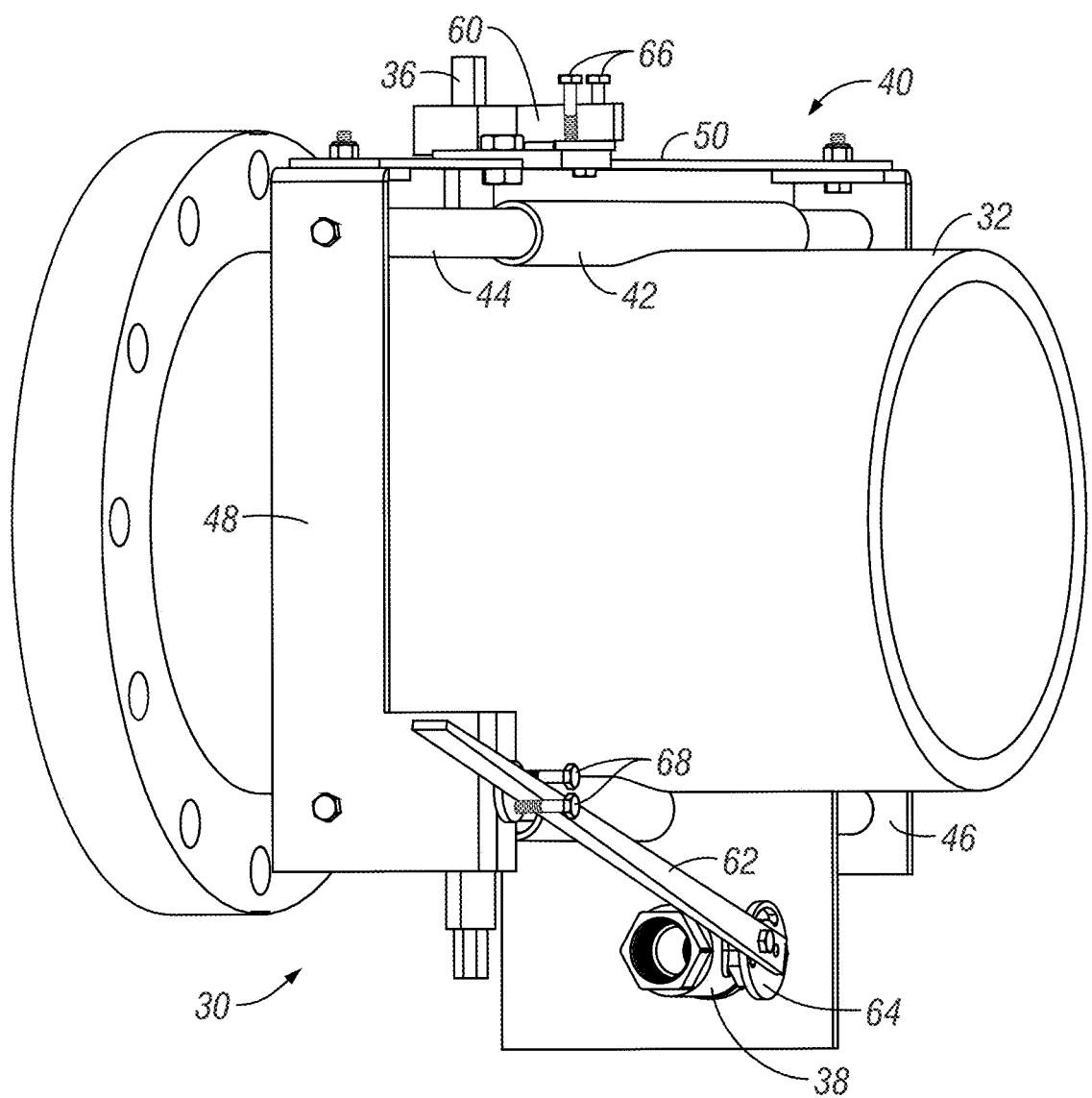
Figure 6:
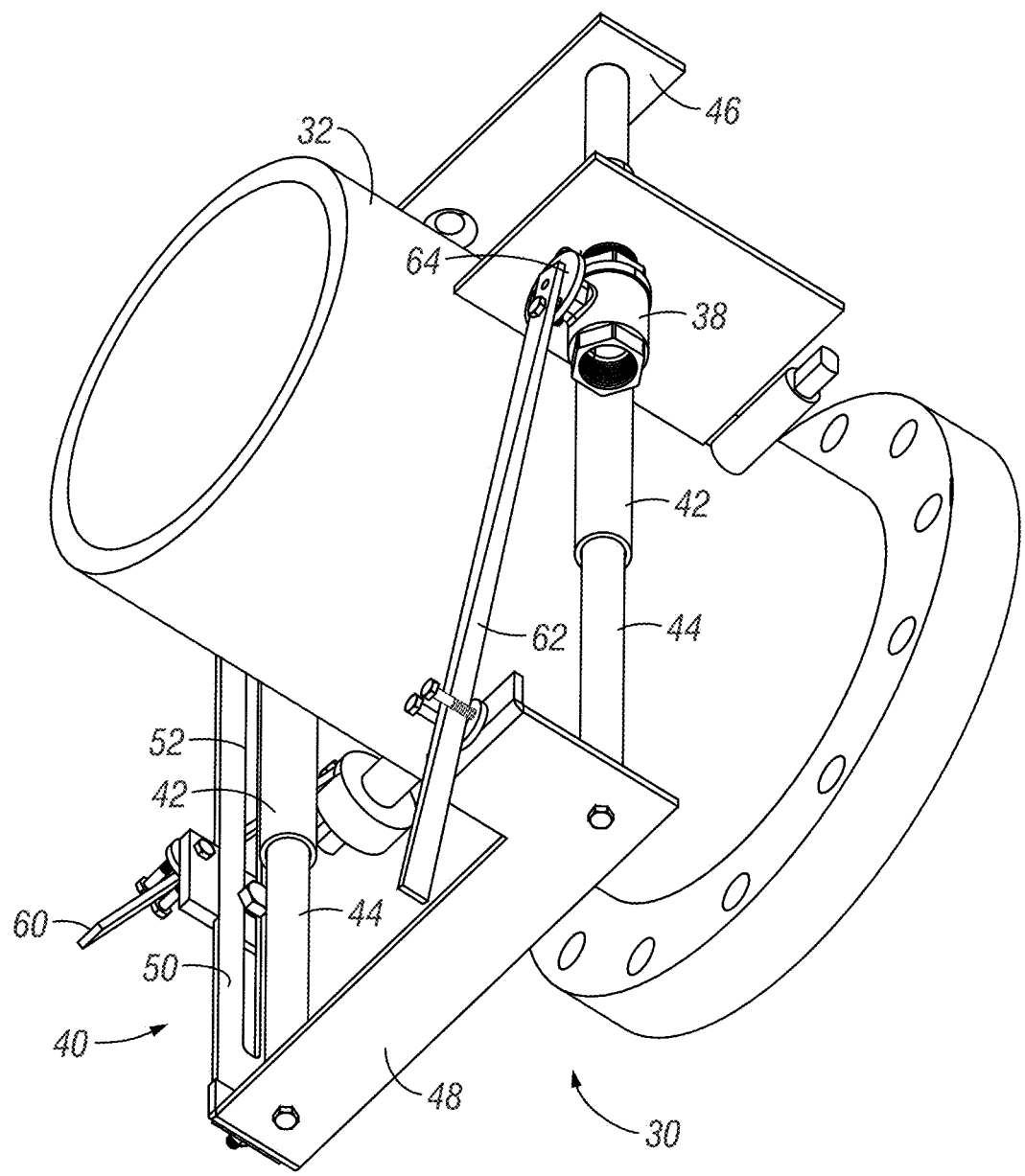
Figure 7:
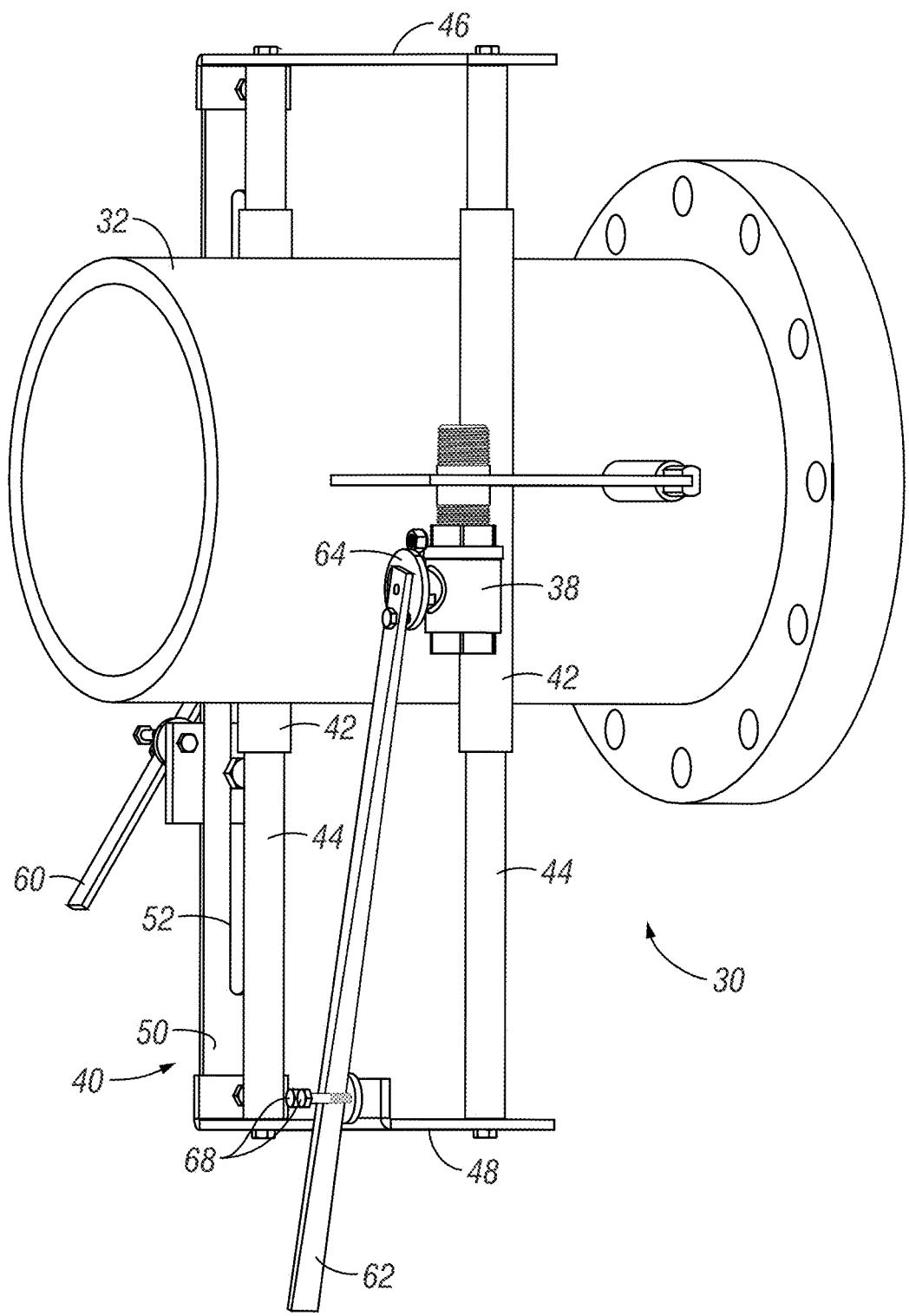
Figure 8:
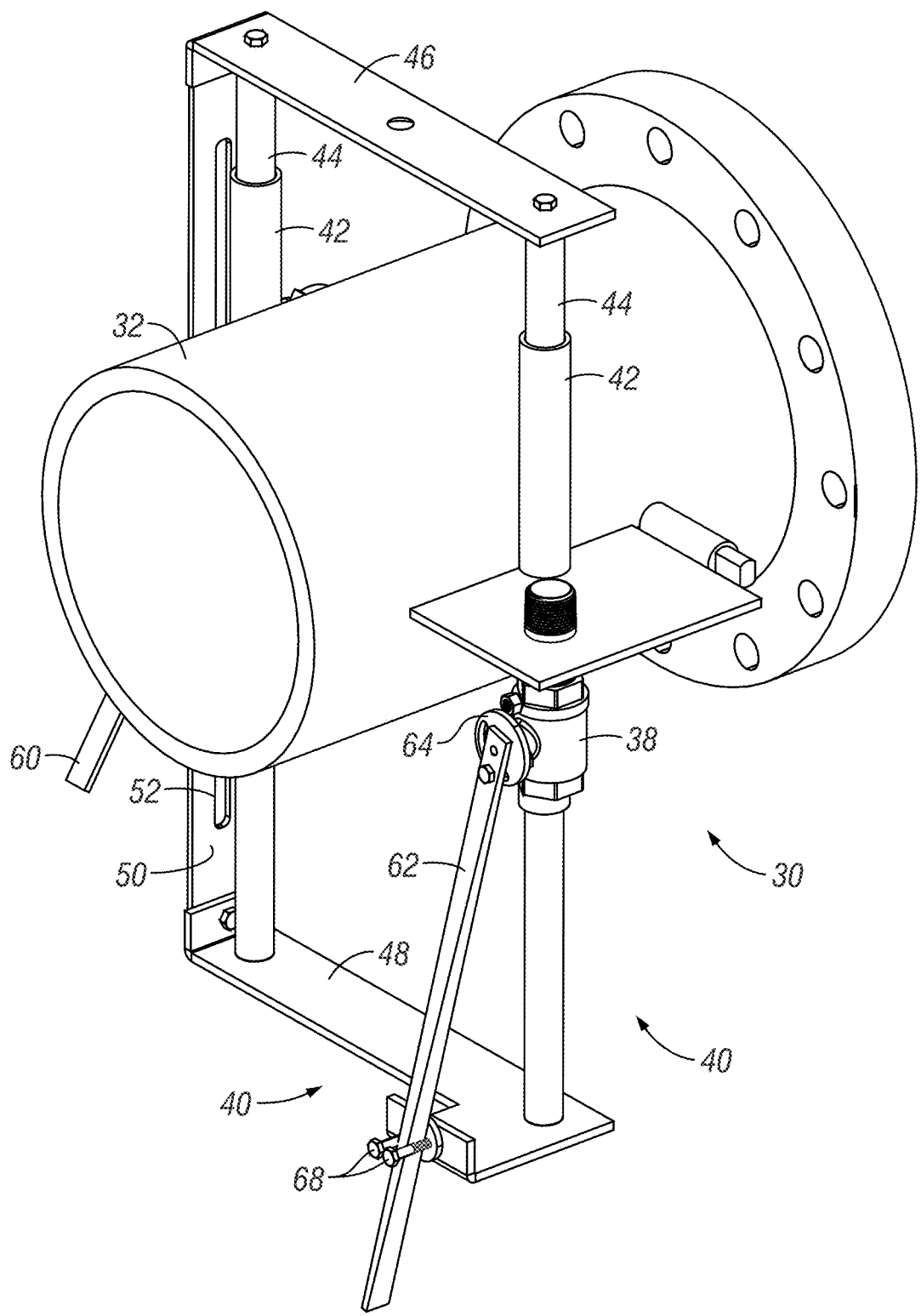

FIG. 1 illustrates a swimming pool 10 having a surge pit 12 remote from the pool, such as in a filter house (not shown). The pool 10 includes a main drain in the bottom of the pool, at the deepest portion, with a drain line 14 leading to the surge pit 12. The pool 10 has a perimeter gutter system 16 with a gutter drain line 18 leading to the surge pit 12.

The surge pit 12 receives water from the main drain 14 and the gutter drain 18. A return line 20 supplies water from the surge pit 12 to the pool 10 via a pump 22 and preferably a filter 24. A filter 26 in the surge pit removes debris from the water in the pit before being pumped to the pool. A drain 28 allows water to be drained from the pit 12, when necessary.

The above description of the pool 10 and surge pit 12 is conventional.

The present invention is directed toward a float valve system 30 for controlling or regulating the water level in the pool 10. This valve system is located in the surge pit 12. The system 30 includes a pipe 32 bolted or otherwise fixed to the end of the main drain 14. A butterfly valve 34 is pivotally mounted on an axle 36 within the pipe 32 so as to be movable between a closed position extending across the diameter of the pipe 32 so as to close flow of water through the pipe 32 and open position parallel with the pipe longitudinal axis so as to allow water to flow from the main drain 14 in to the surge pit 12. A second rotary or butterfly valve 38 is mounted to the pipe 32 and connected to a fresh water line 39. The valve 38 is movable between an open position allowing fresh water to be introduced into the pit 12 from the fresh water line 39 and a closed position which closes the fresh water line 39.

The rotational movement of the valves 34 and 38 are controlled by a sliding frame assembly 40. The frame assembly 40 includes a pair of collars 42 welded on opposite sides of the pipe 32 so as to extend vertically. A pair of rods 44 extend through the collars 42 and are slidable up and down through the collars 42. The upper ends of the rods 44 are connected by an upper plate 46, while the lower ends of the rods 44 are connected by a lower plate 48. A side plate 50 connects the ends of the plates 46, 48 on one side of the pipe 32. The side plate 50 has an elongated slot 52 extending substantially along the length of the plate 50. A second side plate 54 is mounted to the collar 42 on the opposite side of the pipe 32 from the first side plate 50 and provides a mount or connection for the terminal end of the fresh water line 39 to which the fresh water valve 38 is connected.

A float 54 is attached to the upper plate 46 by a rigid rod or pipe 56. As seen FIG. 1, the float resides on top of the water in the pit 12. As the water level rises and falls in the pit, the float 54 causes the rods 44 to slide upwardly or downwardly through the collars 42 via the interconnected plates 46, 48, 50.

A first arm 60 has one end connected to the axle 36 of the butterfly valve 34. A second arm 62 has an end connected to the pivot plate or axle 64 of the fresh water valve 38. The opposite or outer end of the first arm 60 slidably extends through a guide 66 on the side plate 50, while the opposite or outer end of the second arm 62 extends through a guide 68 on the bottom plate 48. In the drawings, the guides 66, 68 are shown as a pair of spaced apart bolts. However, it is understood that the guides at 66, 68 may take other forms, such as pins, a U-shaped member or bolt, or other forms which allows the respective arm 60, 62 to slide therethrough.

Figure 9A:
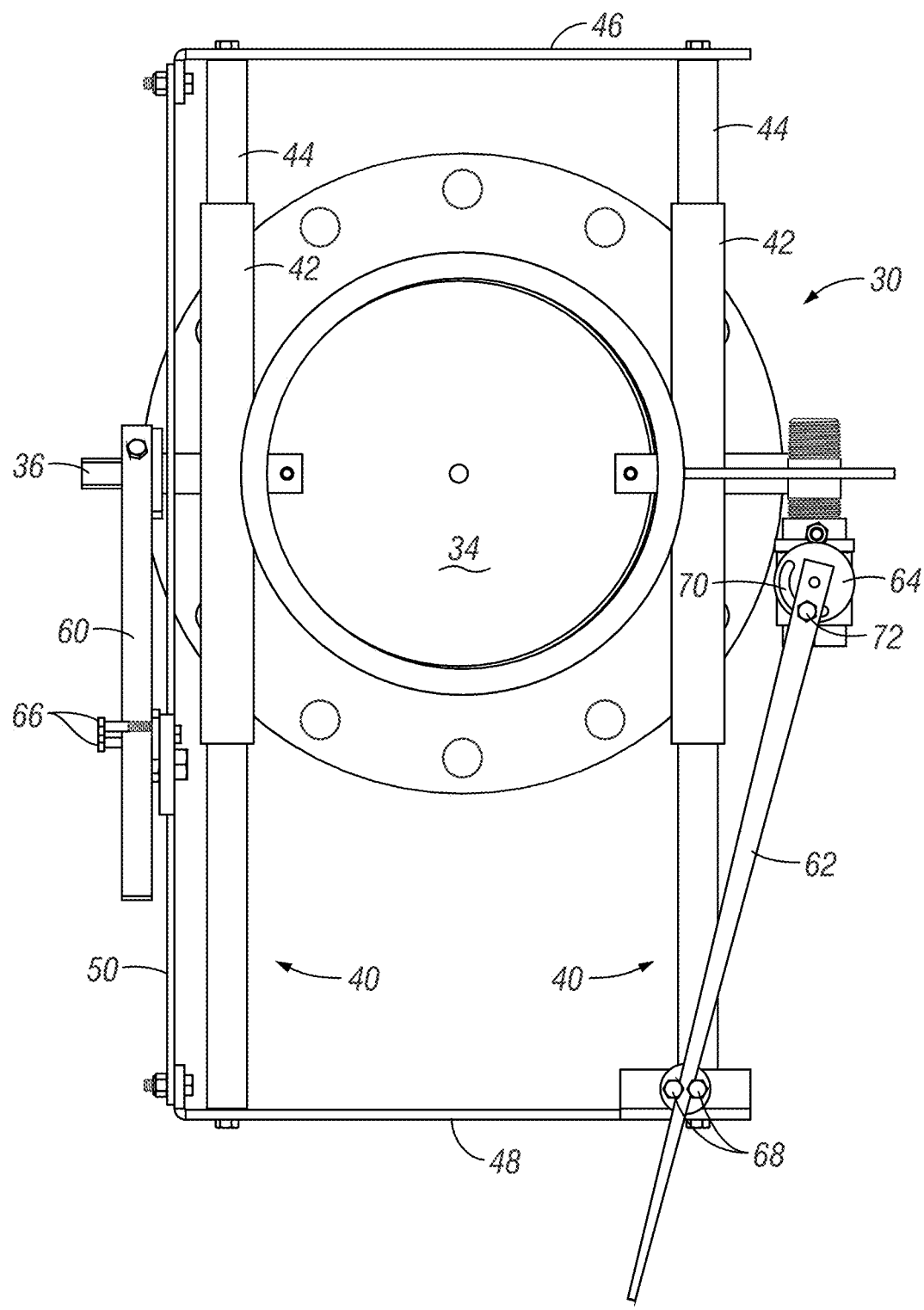
FIGS. 9A and 9B are opposite end views of the system with the butterfly valves in open positions and with the float removed for simplicity.
Figure 9B:
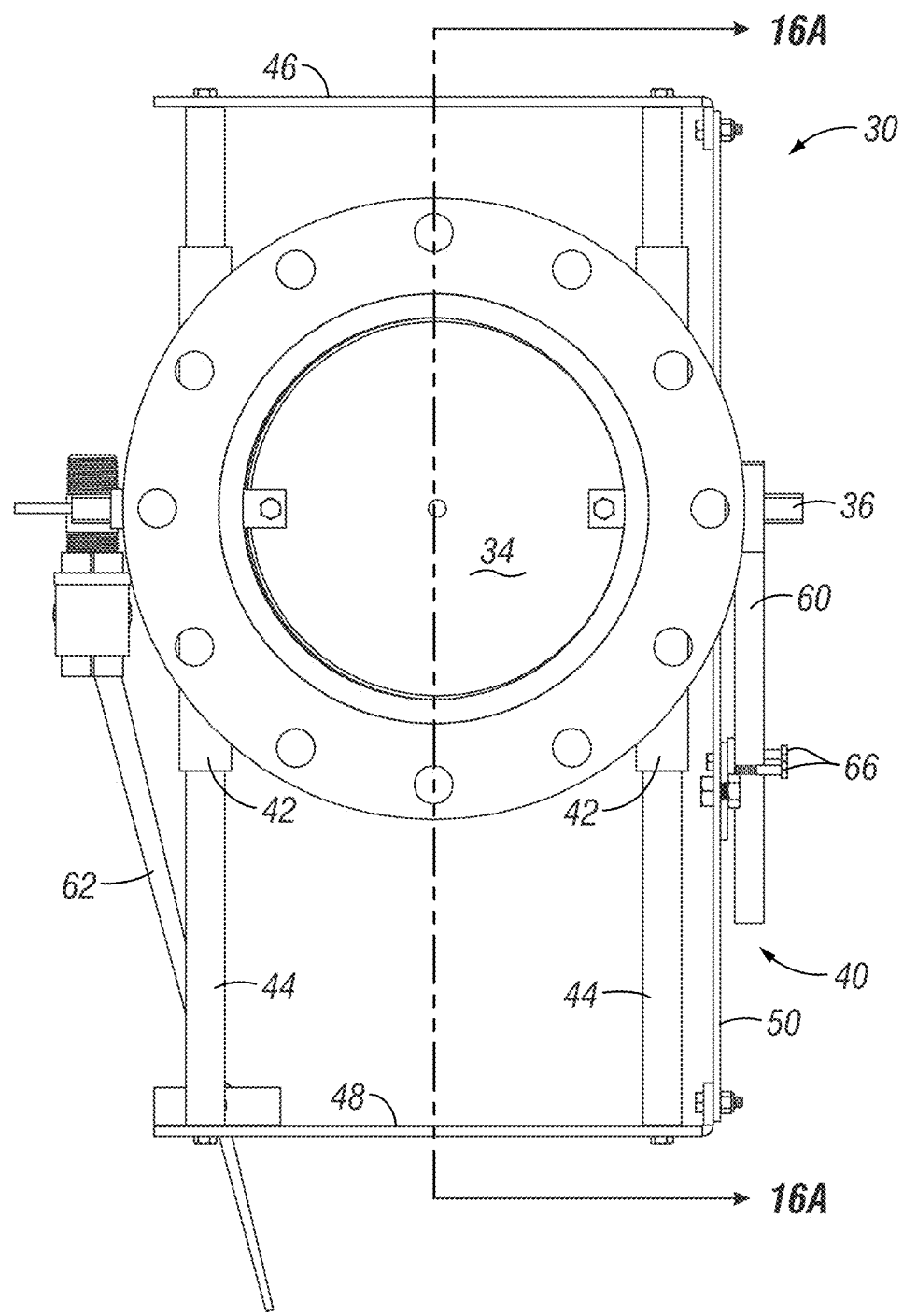
Figure 9C:
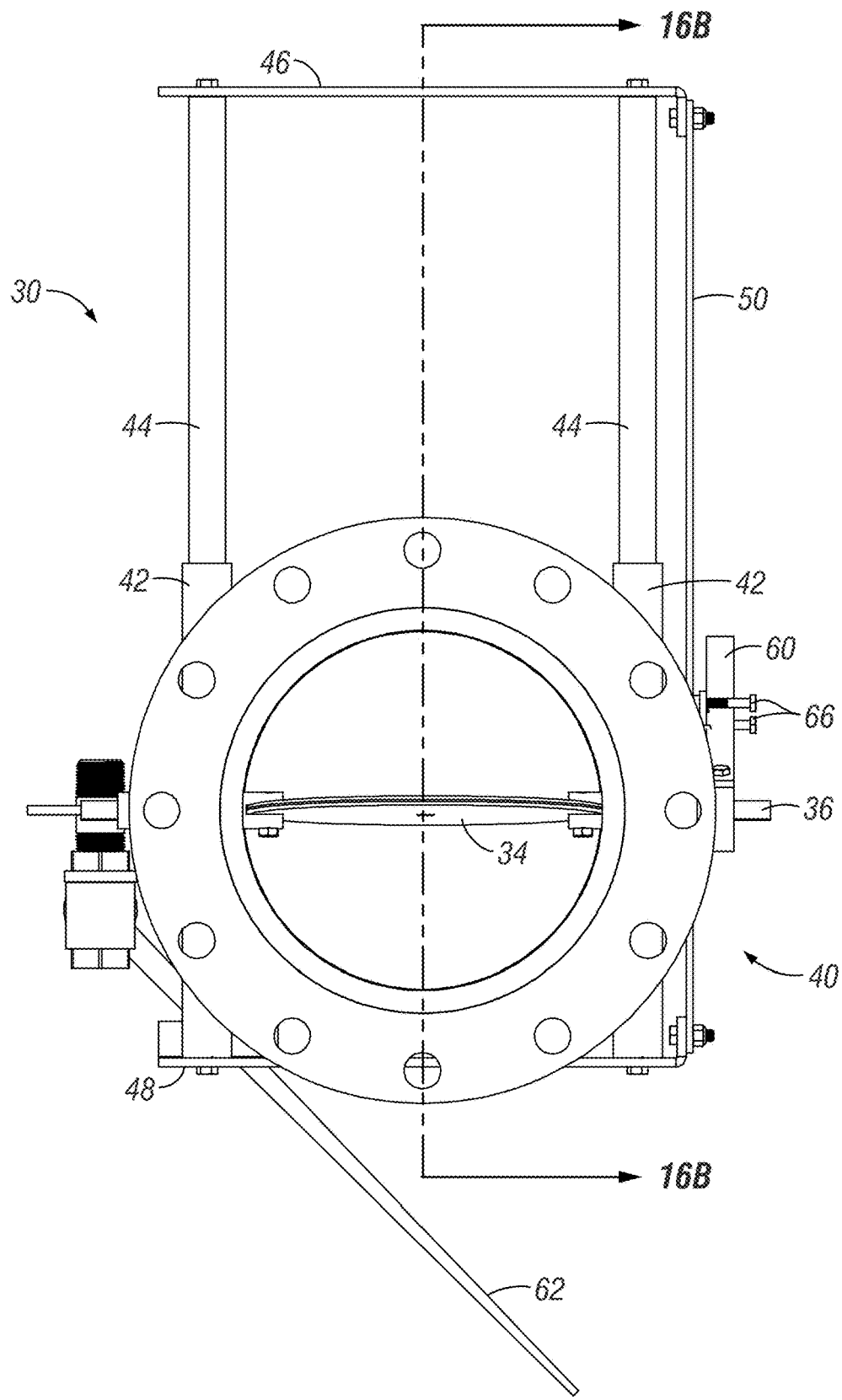
FIG. 9C is a view similar to FIG. 9B, with the valves in an open position.
Figure 10:
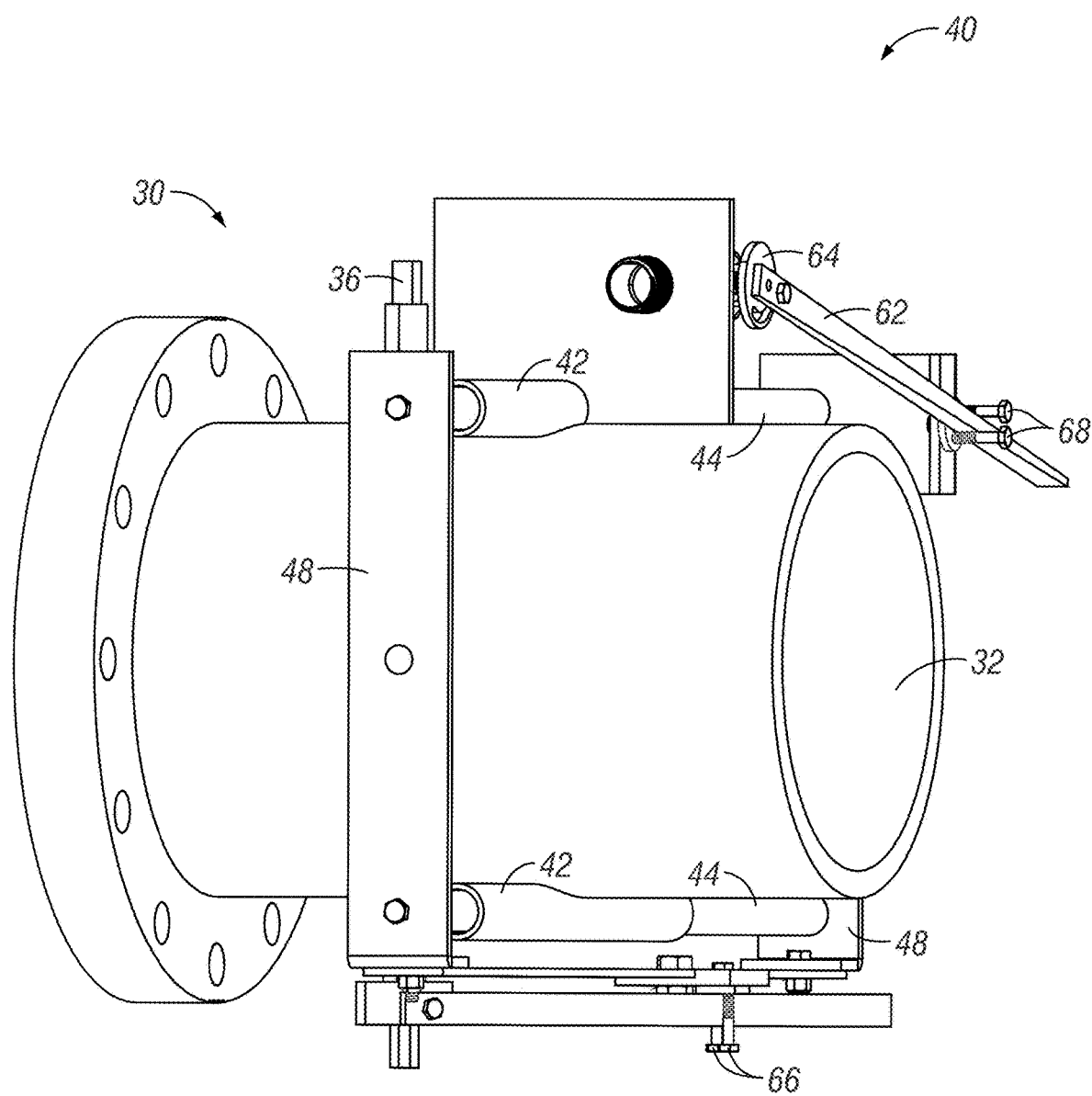
FIG. 10 is a top view of the system of the butterfly valves in open positions, and with the float removed for simplicity.
Figure 11:
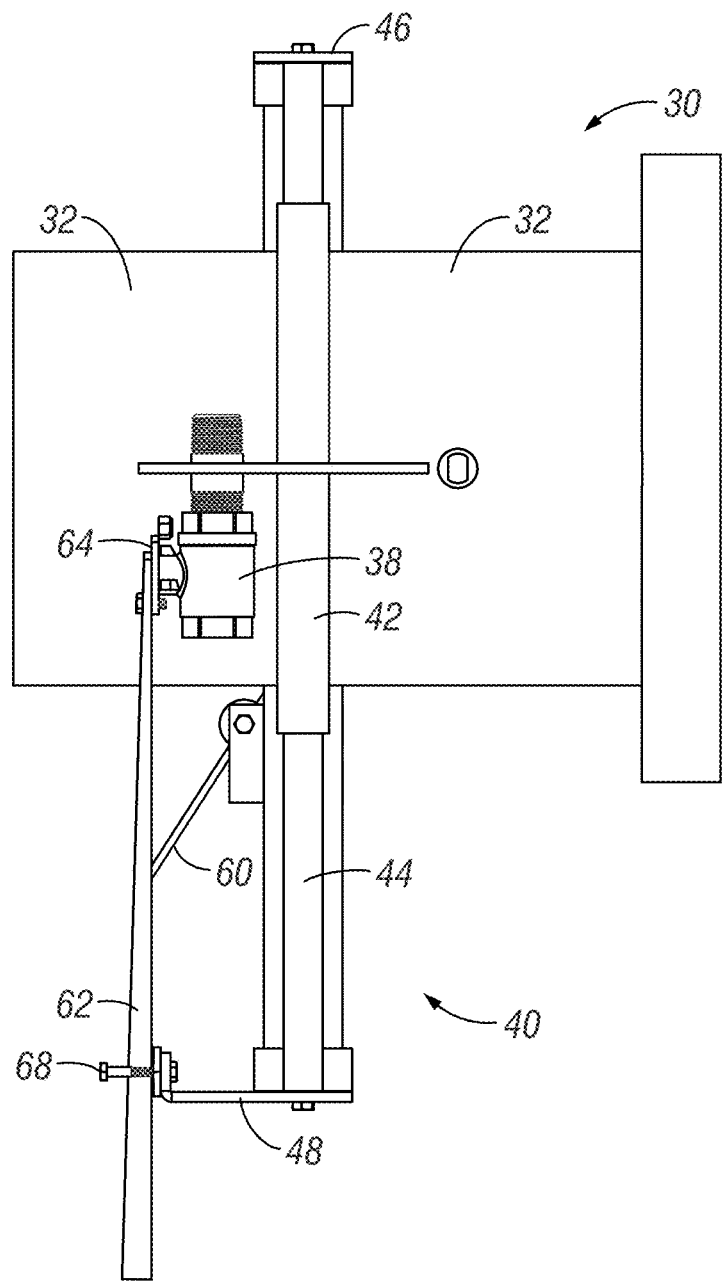
FIG. 11 is an elevation view from one side of the system, with the butterfly valves in open positions, and with the float removed for simplicity.
Figure 12A:
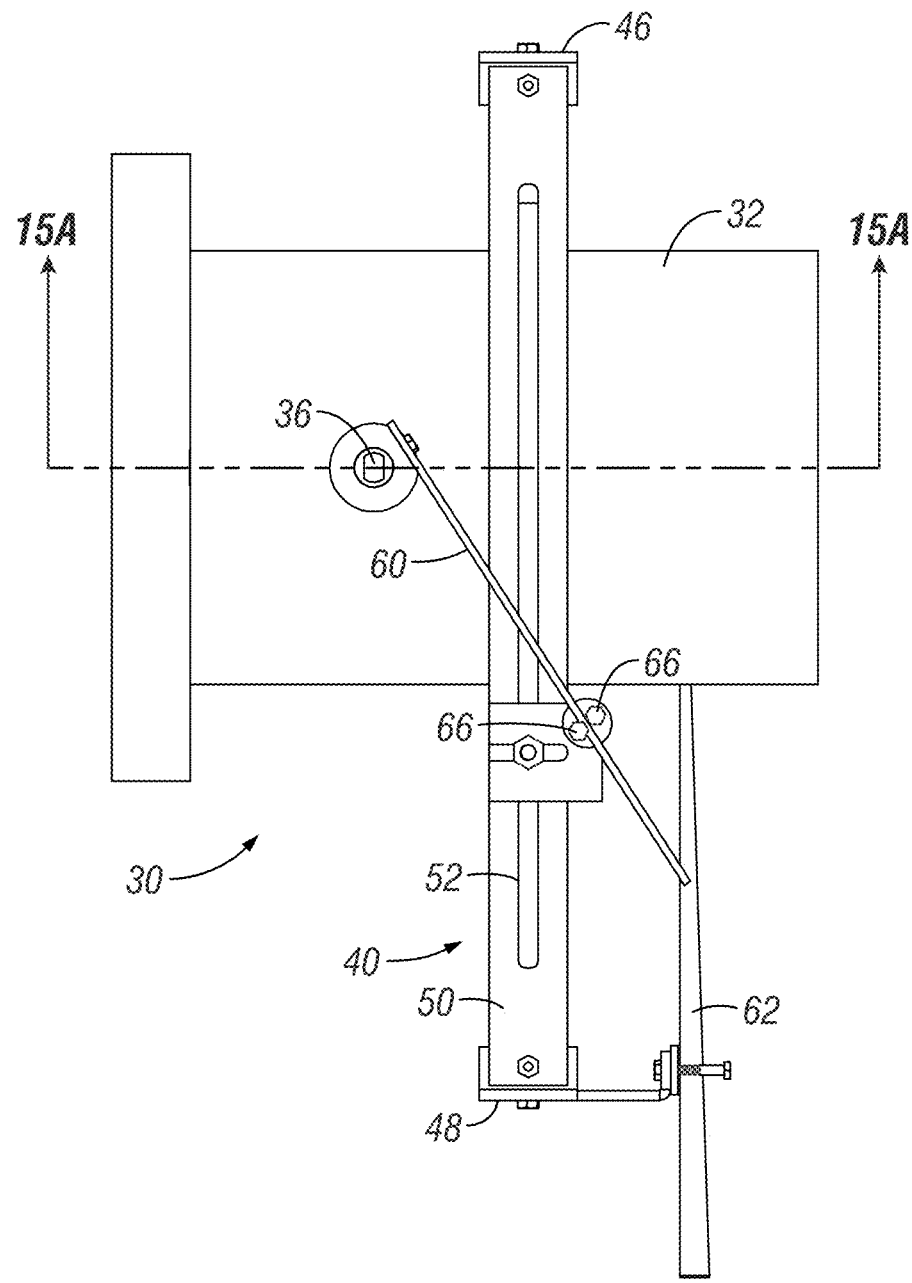
FIG. 12A is a view similar to FIG. 11, from the opposite side of the system.
Figure 12B:
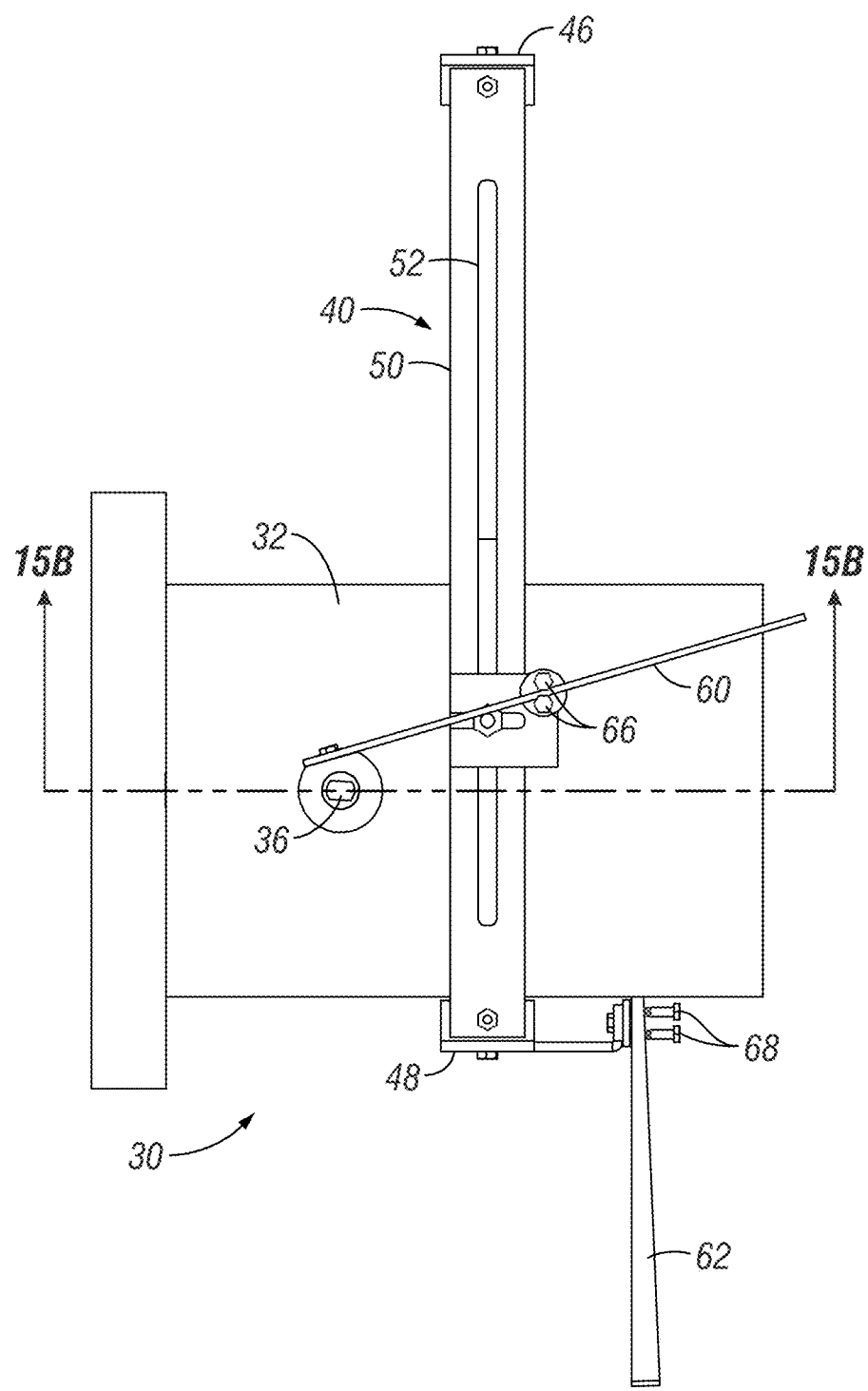
FIG. 12B is a view similar to FIG. 12A, with the butterfly valves in closed positions.
Figure 13A:
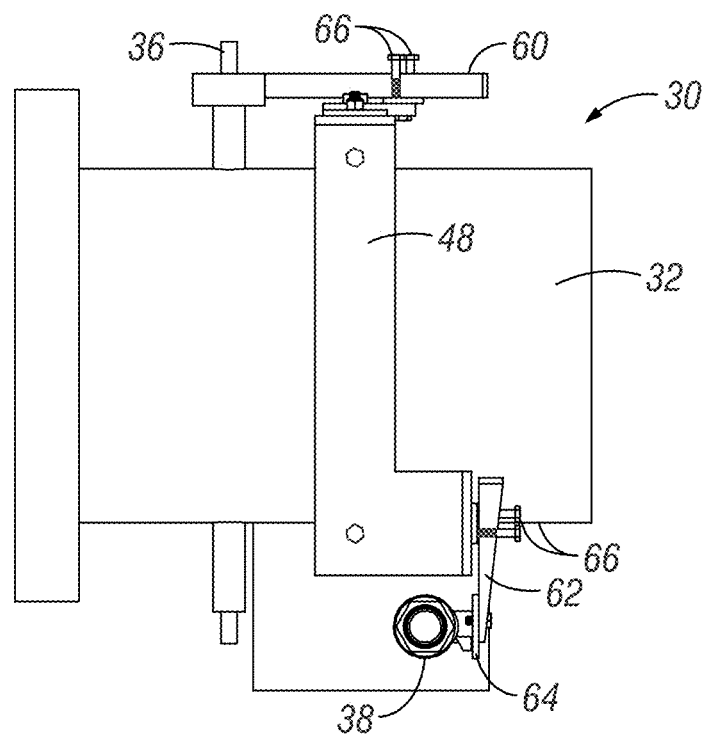
FIGS. 13A and 13B are bottom plane views of the system, with the butterfly valves in open positions and closed positions, respectively.
Figure 13B:
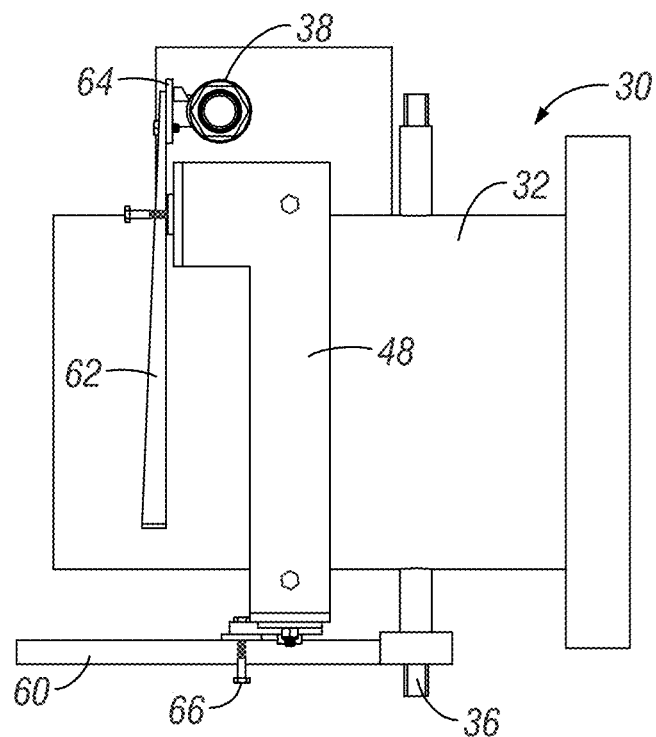
Figure 14:
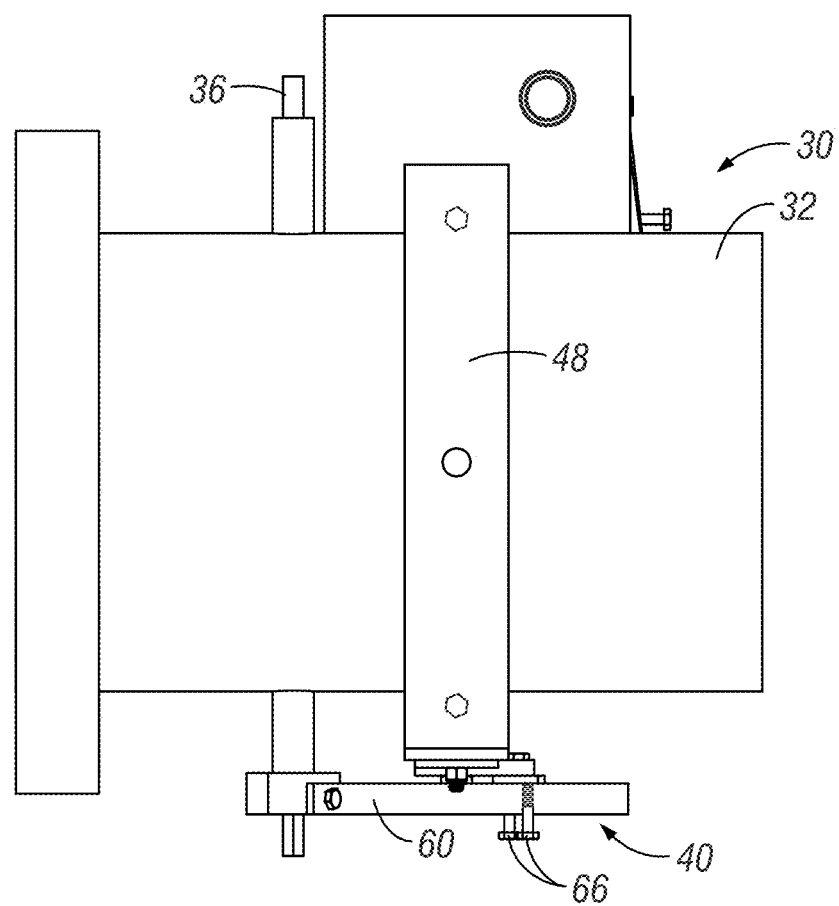
FIG. 14 is a top plane view of the system with the butterfly valves in open positions, and with the float removed for clarity.
Figure 15A:
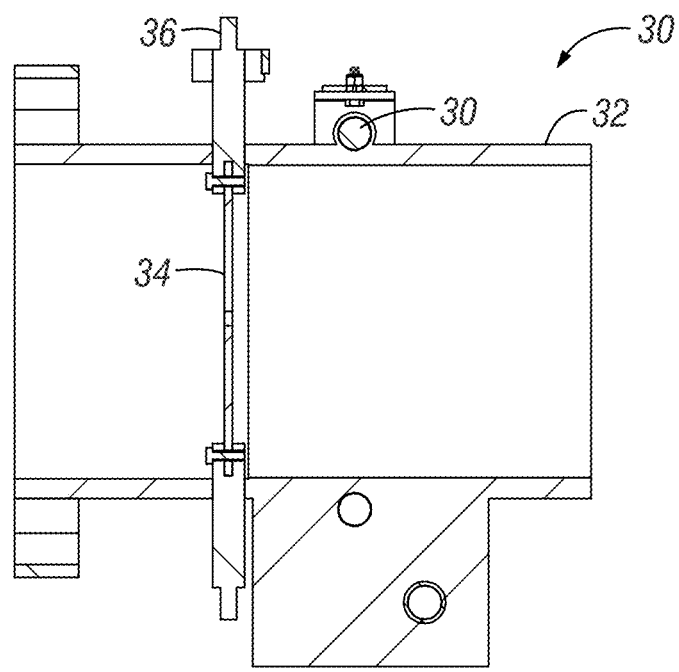
FIG. 15A is a sectional view taken along lines 15A-15A of FIG. 12A.
Figure 15B:
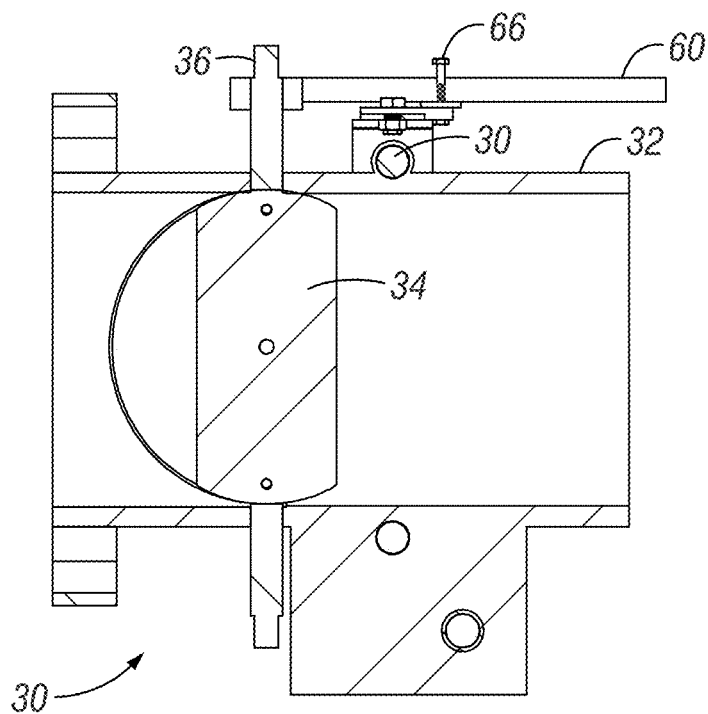
FIG. 15B is a sectional view taken along lines 15B-15B of FIG. 12B.
Figure 16A:
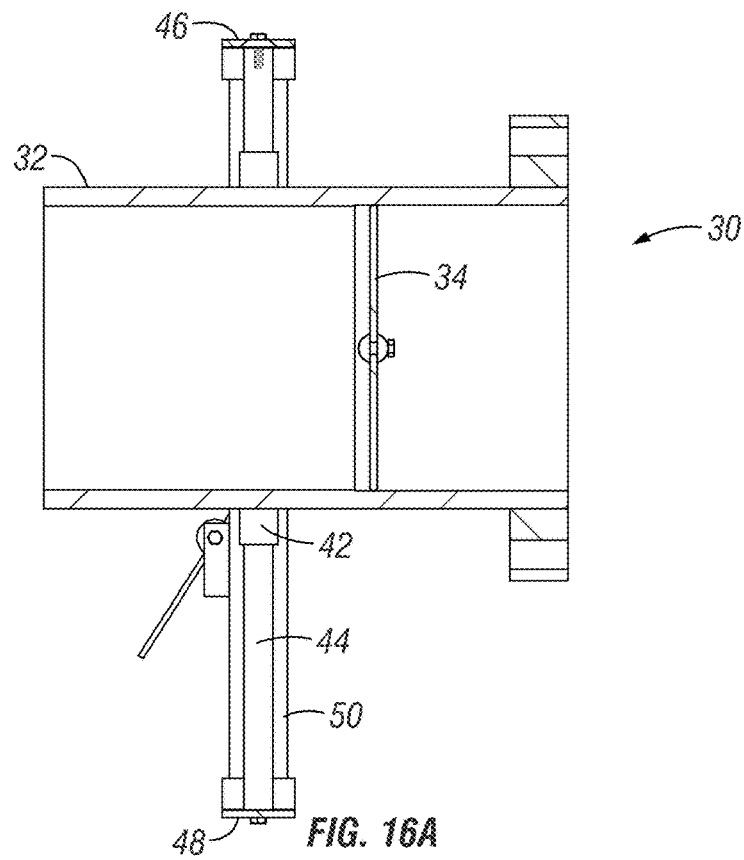
FIG. 16A is a sectional view taken along lines 16A-16A of FIG. 9B, with the main drain line butterfly valve in a closed position.
Figure 16B:
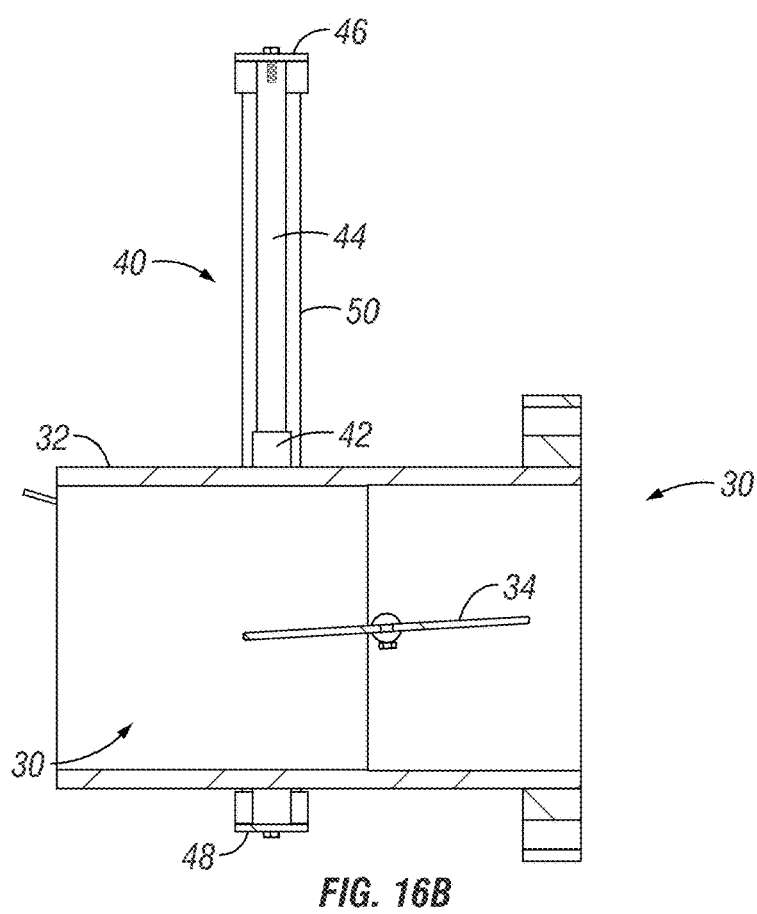
FIG. 16B is a view similar to the FIG. 16A, taken along line 16B-16B of FIG. 9C, with the main drain butterfly valve in an open position.
Figure 17:
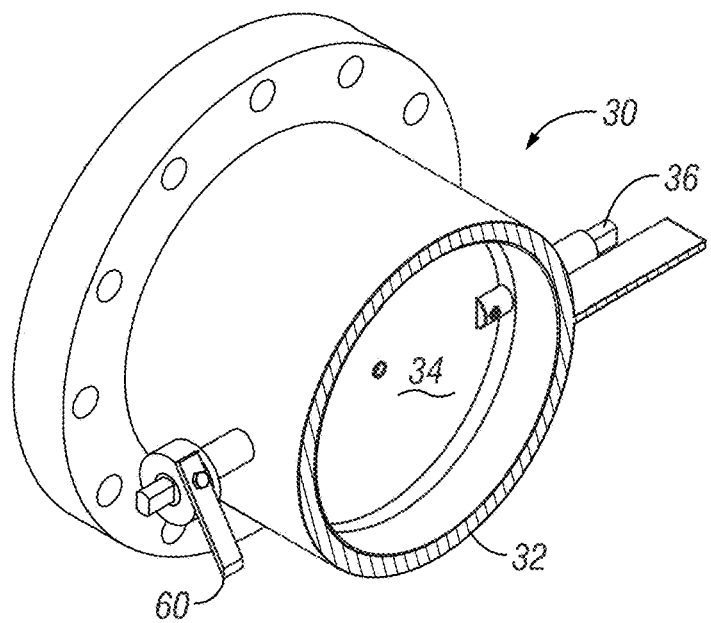
FIG. 17 is a perspective sectional view through a transverse section of the pipe.
Figure 18:
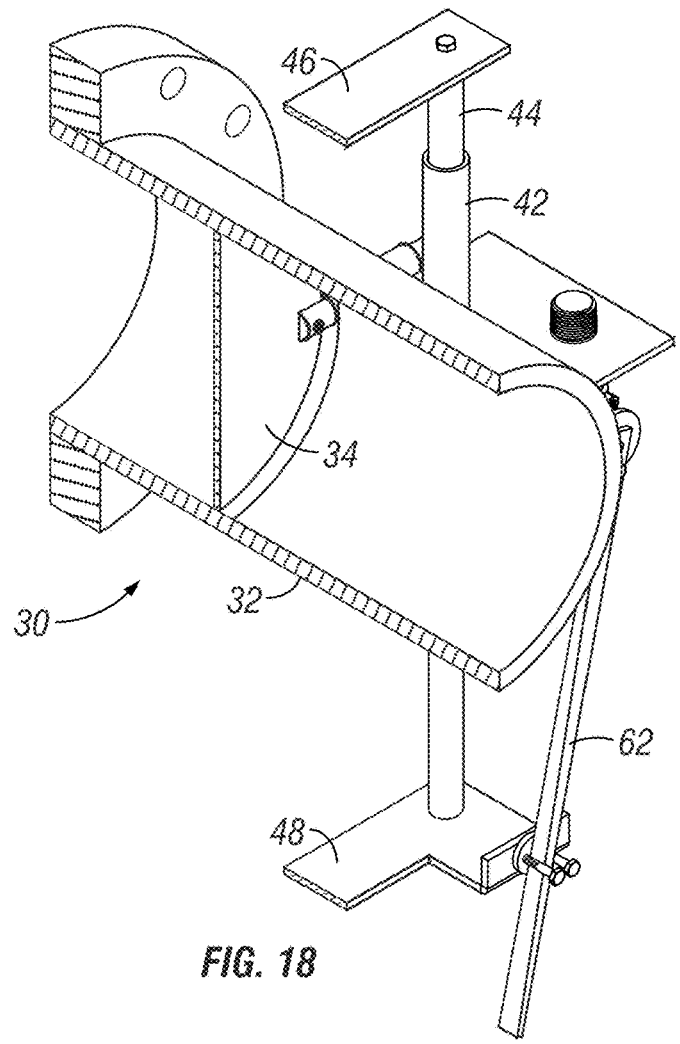
FIG. 18 is a perspective sectional view through a longitudinal plane of the pipe.

The guide 66 is slidably mounted on the side plate 50. The slot 52 in the side plate 50 allows the orientation of the butterfly valve 34 to be adjusted, for example, to assure that the valve 34 is fully closed when the float 54 is raised a predetermined distance. Similarly, the valve 38 includes a plate with a curved slot 70 to slidably receive a pin 72 (FIG. 9A) on the arm 62, to permit the orientation of the valve 38 to be adjusted.

In operation, when the water level in the surge pit 12 drops, the float 54 on the rod 56 drops with the water level, thereby causing the rods 44 to slide downwardly through the collars 42. In turn, the arms 60, 62 slide through the guides at 66, 68, which pivots the butterfly valve axle 36 and the fresh water valve axle 64. Thus, the sliding movement of the arms 60, 62 opens the butterfly valve 34 and the fresh water valve 38 to allow more water into the pit 12, thereby raising the water level in the pit to assure a supply of water to the pump 22 for return to the pool 10 through the return line 20. As the water level in the pit rises, the float 52 pulls the rods 44 upwardly through the collars 42, thereby rotating the arms 60, 62 in the opposite direction via the guides 66, 68, and thereby moving the valves 34, 38 toward their closed positions to reduce water flow into the pit, and eventually to the fully closed position so as to stop the flow of water to the pit from the pool main drain 14 and from the fresh water line 39. A proper water level in the pit 12 also assures proper functioning of the filter 26 upstream from the return line 20.

Thus, the valve system 30 of the present invention automatically regulates the water level in the pit 12 and in the pool 10. The valve system 30 provides a more consistent or constant water level in the surge pit 12, and thus, a more constant or consistent water level in the pool 10. In normal operation, the valves 34, 38 are partially open so that there is an inflow of water into the surge pit 18 from the main drain line 14 and the fresh water line 39. Water normally is also coming into the pit 12 from the gutter drain 18 when a water level in the pool is ideal. As the float 54 drops and rises with decreasing or increasing water levels in the surge pit 12, the butterfly valve 12 and fresh water line valve 38 are opened or closed to a greater extent so as to provide more or less water in of the search pit.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A water valve assembly for regulating water in a swimming pool, the pool including a main drain line for draining water to a surge pit, a gutter system around the pool draining to the surge pit, and a fresh water line for adding fresh water to the surge pit, the assembly comprising:
   a first butterfly valve in the main drain line;
   a second butterfly valve in the fresh water line; and
   a float operatively connected to the butterfly valves to control opening a closing of the valves.

2. The water valve assembly of claim 1 further comprising a frame attached to the main drain line and having a fixed member and a sliding member, and the float being connected to the sliding member.

3. The water assembly valve of claim 2 further comprising a first arm operatively attached to the first butterfly valve, and mounted on the sliding member.

4. The water valve assembly of claim 3 wherein the first arm rotates the first butterfly valve about an axis when the sliding member moves in response to changing water level in the surge pit.

5. The water valve assembly of claim 3 further comprising a second arm operatively attached to the second butterfly valve, and mounted on the sliding member.

6. The water valve assembly of claim 5 wherein the second arm rotates the second butterfly valve about an axis when the sliding member moves in response to changing water level in the surge pit.

7. The water valve assembly of claim 5 wherein first and second arms are adjustably connected to the first and second butterfly valves.

8. The water valve assembly of claim 7 wherein the first and second pivot axes are perpendicular to one another.

9. The water valve assembly of claim 2 wherein the first and second butterfly valves each have a horizontal first pivot axis and the sliding member slides vertically.

10. The water valve assembly of claim 1 wherein the first and second butterfly valves open and close in unison.

11. The water valve assembly of claim 1 wherein the float moves the first and second butterfly valves toward an open position when water in the surge pit recedes and moves the butterfly valves toward the closed position when water in the surge pit rises.

12. A method of automatically regulating water level in a swimming pool, comprising:
   installing a first butterfly valve in a drain line from the pool to a surge pit;
   installing a second butterfly valve in a fresh water line to the surge pit;
   connecting a buoyant member to the butterfly values so as to float on water in the surge pit;
   whereby the buoyant member rotates each butterfly valve to an open position when water in the pit recedes and rotates each butterfly valve to a closed position when water in the pit rises.

13. The method of claim 12 further comprising connecting the buoyant member to a sliding member having first and second arms connected to the first and second butterfly valves, respectively.

14. The method of claim 13 further comprising moving the arms via the sliding member so as to rotate the butterfly valves.

15. The method of claim 12 further comprising rotating each of the butterfly valves in opposite directions between the open and closed positions.

16. A water level control system for a surge pit of a swimming pool having an inlet line from the pool to the surge pit, comprising:
   a first butterfly valve mounted on a first pivot axle in the inlet line for movement between opened and closed positions;
   a first arm outside the drain line and attached to the first pivot axle;
   a float operatively attached to the first arm and floating on top of water in the surge pit; and
   whereby when water level in the surge pit drops, the float falls and rotates the first arm so as to open the first butterfly valve; and
   when the water level in the pit rises, the float rises and rotates the first arm so as to close the first butterfly valve.

17. The water level control system of claim 16 wherein the surge pit includes a fresh water line, and further comprising a second butterfly valve mounted on a second pivot axle in the fresh water line, and a second arm attached to the second pivot axle and operatively attached to the float, whereby when the water level in the surge pit drops, the float falls and rotates the second arm so as to open the second butterfly valve, and when the water level in the surge pit rises, the float rises and rotates the second arm so as to close the second butterfly valve.

18. The water level control system of claim 17 wherein the first and second pivot axles are perpendicular to one another.

19. The water level control system of claim 16 further comprising a tube fixed to the drain line in a transverse orientation and a slide rod slidably mounted in the tube, and the slide rod being connected to the first arm and to the float.

20. The water level control system of claim 16 further comprising an arm guide connected to the slide rod, and the first arm have a free end slidable through the arm guide as the float rises and falls.

* * * * *